United States Patent
Hosoda et al.

(10) Patent No.: US 8,492,500 B2
(45) Date of Patent: Jul. 23, 2013

(54) METHOD FOR PRODUCING LIQUID-CRYSTALLINE POLYESTER

(75) Inventors: Tomoya Hosoda, Tsukuba (JP); Eiji Hosoda, Niihama (JP); Masanobu Matsubara, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/556,963

(22) Filed: Jul. 24, 2012

(65) Prior Publication Data

US 2013/0030142 A1    Jan. 31, 2013

(30) Foreign Application Priority Data

Jul. 29, 2011 (JP) .................................. 2011-166767

(51) Int. Cl.
*C08G 63/02* (2006.01)
*C08G 64/00* (2006.01)

(52) U.S. Cl.
USPC ........... 528/193; 528/182; 528/194; 528/271; 528/272

(58) Field of Classification Search
USPC ......................................... 528/182, 193, 196
See application file for complete search history.

(56) References Cited

U.S. PATENT DOCUMENTS 7,629,398 B2    12/2009    Mizuno

FOREIGN PATENT DOCUMENTS

| JP | 2002-146003 | 5/2002 |
| JP | 2002-302540 | 10/2002 |
| JP | 2005-785843 | 3/2005 |

*Primary Examiner* — Terressa Boykin
(74) *Attorney, Agent, or Firm* — Foley & Lardner LLP

(57) ABSTRACT

The present invention provides a method for producing a liquid-crystalline polyester, the method comprising: a step of melt-polymerizing raw monomers in a melt polymerization vessel to obtain a polymer melt; a step of drawing the polymer melt from the melt polymerization vessel and granulating the polymer melt to obtain a granulate; a step of allowing the granulate to undergo solid phase polymerization in a solid phase polymerization vessel to obtain a solid phase polymer; and a step of making an impact on the solid phase polymerization vessel containing the solid phase polymer, and taking out the solid phase polymer from the solid phase polymerization vessel.

5 Claims, 1 Drawing Sheet

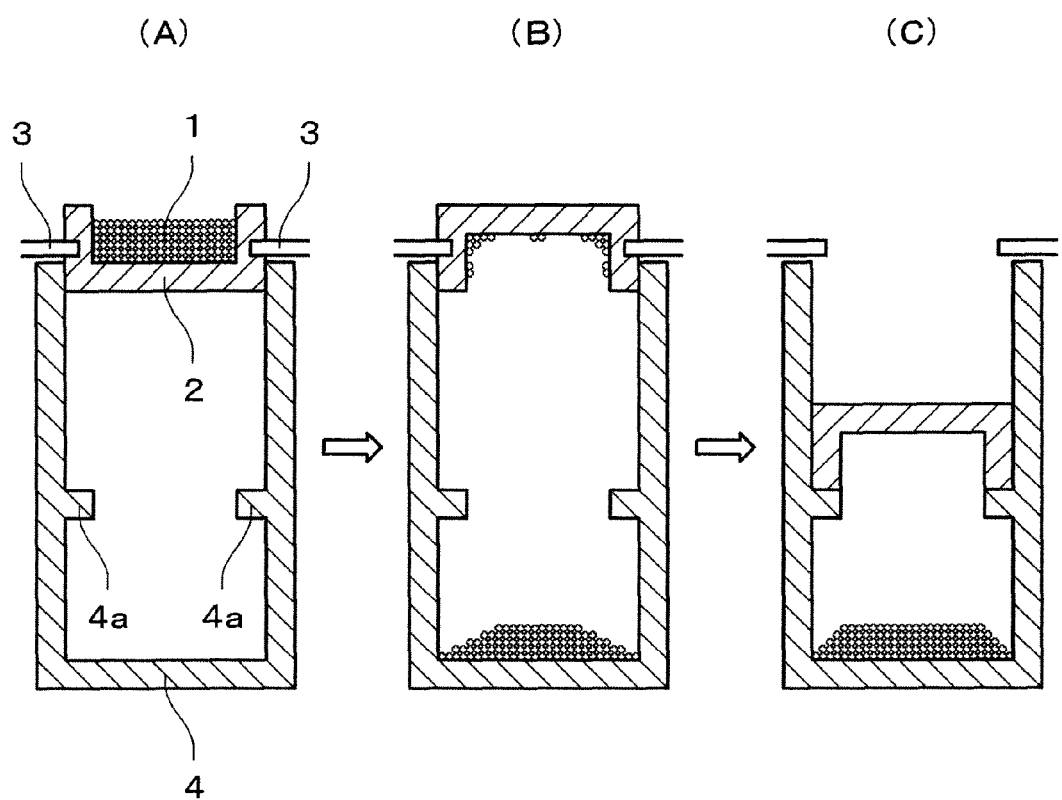

METHOD FOR PRODUCING LIQUID-CRYSTALLINE POLYESTER

BACKGROUND OF THE INVENTION

1. Field of the Invention

The present invention relates to a method for producing a liquid-crystalline polyester by performing solid phase polymerization after melt polymerization.

2. Description of the Related Art

There has been known, as a method for producing a liquid-crystalline polyester with high polymerization degree, a method in which raw monomers are melt-polymerized and the obtained liquid-crystalline polyester with low polymerization degree is allowed to undergo solid phase polymerization (see, for example, JP-A-2002-146003, JP-A-2002-302540 and JP-A-2005-75843). Typically, this method is performed by melt-polymerization raw monomers in a melt polymerization vessel, taking out the obtained polymer melt from the melt polymerization vessel, granulating the polymer melt, and allowing the granulate to undergo solid phase polymerization in a solid phase polymerization vessel.

SUMMARY OF THE INVENTION

In the solid phase polymerization, since a solid phase polymer is likely to adhere to an inner wall of the solid phase polymerization vessel, an operation of scraping the solid phase polymer becomes necessary and therefore recovery of the solid phase polymer may sometimes take much time. Thus, an object of the present invention is to provide a method for producing a liquid-crystalline polyester by performing solid phase polymerization after melt polymerization, the method capable of easily recovering a solid phase polymer.

In order to achieve the above object, the present invention provides a method for producing a liquid-crystalline polyester, the method comprising:

a step of melt-polymerizing raw monomers in a melt polymerization vessel to obtain a polymer melt;

a step of drawing the polymer melt from the melt polymerization vessel and granulating the polymer melt to obtain a granulate;

a step of allowing the granulate to undergo solid phase polymerization in a solid phase polymerization vessel to obtain a solid phase polymer; and a step of making an impact on the solid phase polymerization vessel containing the solid phase polymer, and taking out the solid phase polymer from the solid phase polymerization vessel.

According to the present invention, it is possible to easily recover a solid phase polymer in case of producing a liquid-crystalline polyester by performing solid phase polymerization after melt polymerization.

BRIEF DESCRIPTION OF THE DRAWINGS

FIG. 1 is a sectional view schematically showing an example of the step of taking out a solid phase polymer from a solid phase polymerization vessel.

DETAILED DESCRIPTION OF THE INVENTION

The liquid-crystalline polyester is a polyester which exhibits mesomorphism (namely, liquid crystallinity) in a molten state and the polyester can be produced, for example, by polymerizing (polycondensing) an aromatic hydroxycarboxylic acid, an aromatic dicarboxylic acid, and at least one kind of a compound selected from the group consisting of an aromatic diol, an aromatic hydroxyamine and an aromatic diamine; polymerizing plural kinds of aromatic hydroxycarboxylic acids; polymerizing an aromatic dicarboxylic acid, an aromatic diol, and at least one kind of a compound selected from the group consisting of an aromatic hydroxyamine and an aromatic diamine; or polymerizing a polyester such as polyethylene terephthalate with an aromatic hydroxycarboxylic acid. Herein, a part or all of an aromatic hydroxycarboxylic acid, an aromatic dicarboxylic acid, an aromatic diol, an aromatic hydroxyamine and an aromatic diamine, each independently, may be replaced by polymerizable derivatives thereof.

The present invention is advantageously employed in case of producing a liquid-crystalline polyester including a repeating unit derived from an aromatic hydroxycarboxylic acid, a repeating unit derived from an aromatic dicarboxylic acid, and a repeating unit derived from an aromatic diol, an aromatic hydroxyamine or an aromatic diamine by using, as raw monomers, at least one kind of a compound (1) selected from the group consisting of an aromatic hydroxycarboxylic acid and polymerizable (polycondensable) derivatives thereof, at least one kind of a compound (2) selected from the group consisting of an aromatic dicarboxylic acid and polymerizable (polycondensable) derivatives thereof, and at least one kind of a compound (3) selected from the group consisting of an aromatic diol, an aromatic hydroxyamine, an aromatic diamine and polymerizable (polycondensable) derivatives thereof, and polymerizing these compounds.

Herein, examples of polymerizable derivatives of compounds having a carboxyl group, such as an aromatic hydroxycarboxylic acid and an aromatic dicarboxylic acid include derivatives (esters) in which a carboxyl group is esterified (converted into an alkoxycarbonyl group or an aryloxycarbonyl group); derivatives (acid halides) in which a carboxyl group is halogenated (converted into a haloformyl group); and derivatives (acid anhydrides) in which a carboxyl group is acylated (converted into an acyloxycarbonyl group). Examples of polymerizable derivatives of compounds having a hydroxyl group, such as an aromatic hydroxycarboxylic acid, an aromatic diol and an aromatic hydroxyamine include derivatives (acylates) in which a hydroxyl group is acylated (converted into an acyloxyl group). Examples of polymerizable derivatives of compounds having an amino group, such as an aromatic hydroxyamine and an aromatic diamine include derivatives (acylates) in which an amino group is acylated (converted into an acylamino group).

The compound (1) is preferably an aromatic hydroxycarboxylic acid and a compound in which a hydroxyl group thereof is acylated; the compound (2) is preferably an aromatic dicarboxylic acid; and the compound (3) is preferably an aromatic diol and a compound in which at least one hydroxyl group thereof is acylated, an aromatic hydroxyamine and a compound in which a hydroxyl group and/or an amino group is/are acylated, and an aromatic diamine and a compound in which at least one amino group thereof is acylated.

The compounds (1) to (3) are respectively compounds represented by the formulas (1) to (3) shown below:

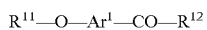

wherein $Ar^1$ represents a phenylene group, a naphthylene group or a biphenylylene group, $R^{11}$ represents a hydrogen atom or an acyl group, $R^{12}$ represents a hydroxyl group, an alkoxyl group, an aryloxyl group, an acyloxyl group or a halogen atom, and hydrogen atoms existing in the group represented by $Ar^1$, each independently, may be substituted with a halogen atom, an alkyl group or an aryl group;

$$R^{21}\text{—CO—}Ar^2\text{—CO—}R^{22} \qquad \text{Formula (2):}$$

wherein $Ar^2$ represents a phenylene group, a naphthylene group, a biphenylylene group, or a group represented by the formula (4) shown below, $R^{21}$ and $R^{22}$ each independently represents a hydroxyl group, an alkoxyl group, an aryloxyl group, an acyloxyl group or a halogen atom, and hydrogen atoms existing in the group represented by $Ar^2$, each independently, may be substituted with a halogen atom, an alkyl group or an aryl group;

$$R^{31}\text{—X—}Ar^3\text{—Y—}R^{32} \qquad \text{Formula (3):}$$

wherein $Ar^3$ represents a phenylene group, a naphthylene group, a biphenylylene group, or a group represented by the formula (4) shown below, X and Y each independently represents an oxygen atom or an imino group (—NH—), $R^{31}$ and $R^{32}$ each independently represents a hydrogen atom or an acyl group, and hydrogen atoms existing in the group represented by $Ar^3$, each independently, may be substituted with a halogen atom, an alkyl group or an aryl group; and

$$\text{—}Ar^{41}\text{—Z—}Ar^{42} \qquad \text{Formula (4):}$$

wherein $Ar^{41}$ and $Ar^{42}$ each independently represents a phenylene group or a naphthylene group, and Z represents an oxygen atom, a sulfur atom, a carbonyl group, a sulfonyl group or an alkylidene group.

Examples of the acyloxyl group represented by $R^{11}$, $R^{31}$ or $R^{32}$ include a formyl group, an acetyl group, a propionyl group and a benzoyl group, and the number of carbon atoms may be from 1 to 10. Examples of the alkoxyl group represented by $R^{12}$, $R^{21}$ or $R^{22}$ include a methoxyl group, an ethoxyl group, an n-propyloxyl group, an isopropyloxyl group, an n-butyloxyl group, an isobutyloxyl group, an s-butyloxyl group, a t-butyloxyl group, an n-hexyloxyl group, a 2-ethylhexyloxyl group, an n-octyloxyl group and an n-decyloxyl group, and the number of carbon atoms may be from 1 to 10. Examples of the aryloxyl group represented by $R^{12}$, $R^{21}$ or $R^{22}$ include a phenyloxyl group, an o-tolyloxyl group, a m-tolyloxyl group, a p-tolyloxyl group, a 1-naphthyloxyl group and a 2-naphthyloxyl group, and the number of carbon atoms may be from 6 to 20. Examples of the acyloxyl group represented by $R^{12}$, $R^{21}$ or $R^{22}$ include a formyloxyl group, an acetyloxyl group, a propionyloxyl group and a benzoyloxyl group, and the number of carbon atoms may be from 1 to 10. Examples of the halogen atom represented by $R^{12}$, $R^{21}$ or $R^{22}$ include a fluorine atom, a chlorine atom, a bromine atom and an iodine atom.

Examples of the alkylidene group represented by Z include a methylene group, an ethylidene group, an isopropylidene group, an n-butylidene group and a 2-ethylhexylidene group, and the number of carbon atoms may be from 1 to 10.

Examples of the halogen atom, with which hydrogen atoms existing in the group represented by $Ar^1$, $Ar^2$ or $Ar^3$ may be substituted, include a fluorine atom, a chlorine atom, a bromine atom and an iodine atom. Examples of the alkyl group, with which hydrogen atoms existing in the group represented by $Ar^1$, $Ar^2$ or $Ar^3$ may be substituted, include a methyl group, an ethyl group, an n-propyl group, an isopropyl group, an n-butyl group, an isobutyl group, an s-butyl group, a t-butyl group, an n-hexyl group, a 2-ethylhexyl group, an n-octyl group and an n-decyl group, and the number of carbon atoms may be from 1 to 10. Examples of the aryl group, with which hydrogen atoms existing in the group represented by $Ar^1$, $Ar^2$ or $Ar^3$ may be substituted, include a phenyl group, an o-tolyl group, a m-tolyl group, a p-tolyl group, a 1-naphthyl group and a 2-naphthyl group, and the number of carbon atoms may be from 6 to 20. In case hydrogen atoms existing in the group represented by $Ar^1$, $Ar^2$ or $Ar^3$ are substituted with these groups, the number, each independently, may be 2 or less, and preferably 1 or less, every group represented by $Ar^1$, $Ar^2$ or $Ar^3$.

The compound (1) is preferably a compound in which is a p-phenylene group, and $Ar^1$ is a 2,6-naphthylene group in the formula (1). The compound (1) is preferably a compound in which $R^{11}$ and $R^{12}$ are respectively hydroxyl groups, and $R^{11}$ is an acyl group and $R^{12}$ is a hydroxyl group in the formula (1).

The compound (2) is preferably a compound in which $Ar^2$ is a p-phenylene group, $Ar^2$ is a m-phenylene group, and $Ar^2$ is a 2,6-naphthylene group in the formula (2). The compound (2) is preferably a compound in which $R^{21}$ and $R^{22}$ are respectively hydroxyl groups in the formula (2).

The compound (3) is preferably a compound in which $Ar^3$ is a p-phenylene group, and $Ar^3$ is a 4,4'-biphenylylene group in the formula (3). The compound (3) is preferably a compound in which X and Y are respectively oxygen atoms, and X is an oxygen atom and Y is an imino group in the formula (3). The compound (3) is preferably a compound in which $R^{31}$ and $R^{32}$ are respectively hydrogen atoms, $R^{31}$ is a hydrogen atom and $R^{32}$ is an acyl group, $R^{31}$ is an acyl group and $R^{32}$ is a hydrogen atom, and $R^{31}$ and $R^{32}$ are respectively acyl groups in the formula (3).

The use amount of the compound (1) may be 30 mol % or more, preferably from 30 to 80 mol %, more preferably from 40 to 70 mol %, and still more preferably from 45 to 65 mol %, based on the total amount of the whole raw monomers. The use amount of the compound (2) may be 35 mol % or less, preferably from 10 to 35 mol %, more preferably from 15 to 30 mol %, and still more preferably from 17.5 to 27.5 mol %, based on the total amount of the whole raw monomers. The use amount of the compound (3) may be 35 mol % or less, preferably from 10 to 35 mol %, more preferably from 15 to 30 mol %, still more preferably from 17.5 to 27.5 mol %, based on the total amount of the whole raw monomers. As the use amount of the compound (1) increases, melt fluidity, heat resistance and rigidity of the liquid-crystalline polyester are likely to be improved. When the amount is too large, the melting temperature of the liquid-crystalline polyester is likely to increase and the temperature required for molding is likely to increase, and also the solubility of the liquid-crystalline polyester in a solvent is likely to decrease.

A ratio of the use amount of the compound (2) to the use amount of the compound (3) may be from 0.9/1 to 1/0.9, preferably from 0.95/1 to 1/0.95, and more preferably from 0.98/1 to 1/0.98, in terms of [use amount of the compound (2)]/[use amount of the compound (3)] (mol/mol).

Two or more kinds of the compounds (1) to (3), each independently, may be used. Compounds other than the compounds (1) to (3) may be used as raw monomers, and the use amount may be 10 mol % or less, and preferably 5 mol % or less, based on the total amount of the whole raw monomers.

The above-mentioned raw monomers are melt-polymerized in a melt polymerization vessel to obtain a polymer melt. It is preferred to use, as the melt polymerization vessel, a melt polymerization vessel having a draw outlet at the bottom so that a polymer melt can be taken out by drawing it in a molten state from the melt polymerization vessel after melt polymerization.

The present invention is advantageously employed in case of performing melt polymerization using a heterocyclic compound containing two or more nitrogen atoms as a catalyst. A solid phase polymer can be recovered more easily by performing melt polymerization using a heterocyclic compound containing two or more nitrogen atoms as a catalyst, and also a liquid-crystalline polyester having excellent impact resistance can be produced with satisfactory productivity.

Examples of the heterocyclic compound containing two or more nitrogen atoms include an imidazole compound, a triazole compound, a diazine compound, a triazine compound, a dipyridyl compound, a phenanthroline compound, a diazabicycloalkane compound, a diazabicycloalkene compound, an aminopyridine compound and a purine compound, and two or more kinds of them may be used. Among these compounds, an imidazole compound is preferable.

Examples of the imidazole compound include compounds represented by the formula (I) shown below:

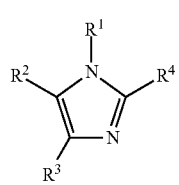

(I)

wherein $R^1$ to $R^4$ each independently represents a hydrogen atom, an alkyl group, an aryl group or an aralkyl group.

Examples of the alkyl group represented by any one of $R^1$ to $R^4$ include a methyl group, an ethyl group, an n-propyl group, an isopropyl group, an n-butyl group, an isobutyl group, an s-butyl group, a t-butyl group, an n-hexyl group, a 2-ethylhexyl group, an n-octyl group and an n-decyl group, and the number of carbon atoms may be from 1 to 10 and preferably from 1 to 4. Examples of the aryl group represented by any one of $R^1$ to $R^4$ include a phenyl group, an o-tolyl group, a m-tolyl group, a p-tolyl group, a 1-naphthyl group and a 2-naphthyl group, and the number of carbon atoms may be from 6 to 20, and preferably from 6 to 10. Examples of the aralkyl group represented by any one of $R^1$ to $R^4$ include a benzyl group, a 1-phenylethyl group, a 2-phenylethyl group, a 1-phenylpropyl group, a 2-phenylpropyl group and a 3-phenylpropyl group, and the number of carbon atoms may be from 6 to 20, and preferably from 6 to 10.

The imidazole compound is preferably a compound in which $R^1$ is an alkyl group, an aryl group or an aralkyl group and $R^2$ to $R^4$ are respectively hydrogen atoms in the formula (I), and more preferably a compound in which $R^1$ is an alkyl group and $R^2$ to $R^4$ are respectively hydrogen atoms.

Examples of the triazole compound include 1,2,3-triazole, 1,2,4-triazole and benzotriazole. Examples of the diazine compound include pyridazine (1,2-diazine), pyrimidine (1,3-diazine) and pyrazine (1,4-diazine). Examples of the triazine compound include 1,2,3-triazine, 1,2,4-triazine and 1,3,5-triazine. Examples of the dipyridyl compound include 2,2'-dipyridyl and 4,4'-dipyridyl. Examples of the phenanthroline compound include 1,7-phenanthroline (1,5-diazaphenanthrene), 1,10-phenanthroline (1,5-diazaphenanthrene) and 4,7-phenanthroline (1,8-diazaphenanthrene). Examples of the diazabicycloalkane compound include 1,4-diazabicyclo[2.2.2]octane. Examples of the diazabicycloalkene compound include 1,5-diazabicyclo[4.3.0]non-5-ene and 1,8-diazabicyclo[5.4.0]undec-7-ene. Examples of the aminopyridine compound include N,N-dialkylpyridines such as N,N-dimethylaminopyridine. Examples of the purine compound include 7-alkylpurines such as purine and 7-methylpurine.

The use amount of the heterocyclic compound containing two or more nitrogen atoms may be from 0.002 to 2 mol %, preferably from 0.006 to 1 mol %, and more preferably from 0.02 to 0.6 mol %, based on the total of the whole raw monomers. When the use amount is too small, impact resistance and productivity of the liquid-crystalline polyester are likely to become insufficient. When the use amount is too large, the liquid-crystalline polyester is likely to undergo coloration and it may become difficult to control polymerization.

The melt polymerization is preferably performed until a flow initiation temperature of the obtained polymer melt becomes 150 to 320° C., and more preferably 200 to 300° C.

When the flow initiation temperature of the polymer melt is too high, in case of taking out a polymer melt in a molten state from a melt polymerization vessel, it becomes difficult to draw the polymer melt. When the flow initiation temperature is too low, even if solid phase polymerization is subsequently performed, the polymerization degree of the obtained solid phase polymer is likely to become insufficient and thus heat resistance and rigidity thereof are likely to become insufficient.

The flow initiation temperature of the polymer melt can be adjusted by controlling the temperature and time of the melt polymerization according to the composition of raw monomers, kind and amount of the heterocyclic compound containing two or more nitrogen atoms, timing of addition and the like. In case the flow initiation temperature of the polymer melt is slightly high, the maximum temperature of melt polymerization may be lowered or the retention time at the maximum temperature may be shorten so as to lower the flow initiation temperature. In case the flow initiation temperature of the polymer melt is slightly low, the maximum temperature of melt polymerization may be raised or the retention time at the maximum temperature may be prolonged so as to raise the flow initiation temperature.

The flow initiation temperature in the present invention is also called a flow temperature and means a temperature at which a melt viscosity becomes 4,800 Pa·s (48,000 poise) when a liquid-crystalline polyester is melted while heating at a heating rate of 4° C./min under a load of 9.8 MPa (100 kg/cm²) and extruded through a nozzle having an inner diameter of 1 mm and a length of 10 mm using a capillary rheometer, and the flow initiation temperature serves as an index indicating a molecular weight of the liquid-crystalline polyester (see "Liquid-crystallineline Polymer Synthesis, Molding, and Application" edited by Naoyuki Koide, page 95, published by CMC Publishing Co., Ltd. on Jun. 5, 1987).

After melt polymerization, a polymer melt is taken out from a melt polymerization vessel and granulated to obtain a granulate. The polymer melt is preferably taken out from the melt polymerization vessel by drawing the polymer melt in a molten state from the melt polymerization vessel. The polymer melt is optionally drawn by increasing the pressure inside the vessel, and the pressure is preferably from 0.005 to 0.2 MPa-G, and more preferably from 0.007 to 0.2 MPa-G, in terms of a gauge pressure.

The granulation of the polymer melt may be performed by solidifying the polymer melt in a molten state through cooling, and grinding the obtained solid matter to form a powder, or solidifying the polymer melt in a molten state while cooling to form a strand, and cutting the obtained strand to form a pellet.

The obtained granulate is allowed to undergo solid phase polymerization in a solid phase polymerization vessel to obtain a solid phase polymer. Thereby, it is possible to obtain a liquid-crystalline polyester which is excellent in heat resistance and rigidity. It is preferred to use, as the solid phase polymerization vessel, a tray made of metal such as stainless steel (SUS).

The solid phase polymerization is preferably performed under an atmosphere of an inert gas such as a nitrogen gas at 180 to 280° C. for 5 minutes to 30 hours. The solid phase polymerization temperature is more preferably from 180 to 240° C., and still more preferably from 200 to 240° C. When the solid phase polymerization temperature is too low, the polymerization is less likely to proceed. When the solid phase polymerization temperature is too high, the solid phase polymer is likely to undergo coloration.

The solid phase polymerization is preferably performed until a flow initiation temperature of the obtained solid phase polymer becomes 200 to 420° C., and more preferably 240 to 400° C. When the flow initiation is temperature of the solid phase polymer is too high, the melting temperature is likely to increase and the temperature required for molding is likely to increase, and also the solubility in a solvent is likely to decrease. When the flow initiation temperature is too low, heat resistance and rigidity are likely to become insufficient.

After solid phase polymerization, a solid phase polymer is taken out from the solid phase polymerization vessel and the solid phase polymer is recovered as a liquid-crystalline polyester which is a product. In the present invention, the solid phase polymer is taken out from the solid phase polymerization vessel by make an impact on the solid phase polymerization vessel containing the solid phase polymer. Thereby, it is possible to easily recover the solid phase polymer adhered to the inner wall of the solid phase polymerization vessel without requiring an operation such as scraping.

The solid phase polymer is preferably taken out from the solid phase polymerization vessel by allowing the opening of the solid phase polymerization vessel containing the solid phase polymer to face downward thereby falling the solid phase polymer, and making an impact thereon.

FIG. 1 is a sectional view schematically showing an example of the step of taking out a solid phase polymer from a solid phase polymerization vessel. First, a tray 2 as a solid phase polymerization vessel containing a solid phase polymer 1 is held by arms 3, 3 and transported to the upper portion of a recovery vessel 4 (FIG. 1A). Next, when the tray 2 is rotated by rotation of the arms 3, 3 thereby allowing an opening of the tray 2 to face downward, most of the solid phase polymer 1 falls on the bottom of the recovery vessel 4 and recovered. However, a part of the solid phase polymer 1 adheres to an inner wall of the tray (FIG. 1B). When an impact is made on the tray 2 by releasing holding of the tray 2 with the arms 3, 3 to cause falling of the tray 2, resulting in collision with protrusions 4a, 4a of the inner wall of the recovery vessel 4, a part of the solid phase polymer 1 adhered to the inner wall of the tray 2 also falls on the bottom of the recovery vessel 4 and recovered (FIG. 1C). In such a way, the solid phase polymer can be easily recovered by making an impact on the solid phase polymerization vessel containing the solid phase polymer. In the example of FIG. 1, while an example was illustrated in which an impact is made on a tray 2 by collision of the fallen tray 2 with protrusions 4a, 4a of the inner wall of the recovery vessel 4, an impact may be made on the tray 2 by arranging a lattice or net horizontally with the inner wall of the recovery vessel 4, followed by collision with the fallen tray 2, as another example. Alternatively, an impact may be made on the tray 2 by clanging the rear surface of the tray 2 with a hammer.

The liquid-crystalline polyester thus obtained is optionally mixed with a filler and an additive, and thus obtained liquid-crystalline polyester can be used as a molding material for the production of various products, including electric and electronic components.

EXAMPLES

Measurement Flow Initiation Temperature

Using a flow tester Model CFT-500 manufactured by Shimadzu Corporation, a flow initiation temperature was measured by the following procedure. About 2 g of a liquid-crystalline polyester was filled in a cylinder with a die including a nozzle having an inner diameter of 1 mm and a length of 10 mm attached thereto, and the liquid-crystalline polyester was extruded through the nozzle while being melted at a temperature rise rate of 4° C./minute under a load of 9.8 MPa (100 kg/cm$^2$), and then the temperature at which the liquid-crystalline polyester shows a melt viscosity of 4,800 Pa·s (48,000 poise) was measured.

Example 1

In an acylation vessel equipped with a stirrer, a nitrogen gas introducing device, a thermometer and a reflux condenser, 60 mol % of p-hydroxybenzoic acid, 15 mol % of terephthalic acid, 5 mol % of isophthalic acid and 20 mol % of 4,4'-dihydroxybiphenyl were charged, and then acetic anhydride as an acylating agent was charged in the amount of 1.1 mol per mol of the total amount of hydroxyl groups of p-hydroxybenzoic acid and hydroxyl groups of 4,4'-dihydroxybiphenyl. Next, 1-methylimidazol was charged in the amount of 0.019 mol % based on the total amount of hydroxybenzoic acid, terephthalic acid, isophthalic acid and 4,4'-dihydroxybiphenyl. After replacing a gas in the acylation vessel by a nitrogen gas, acylation was performed by raising the temperature from room temperature to 145° C. over 30 minutes while stirring under a nitrogen gas flow and refluxing at 145° C. for 1 hour.

To the thus obtained acylation reaction mixture, 1-methylimidazole was further added in the amount of 0.187 mol % based on the total amount of p-hydroxybenzoic acid, terephthalic acid, isophthalic acid and 4,4'-dihydroxybiphenyl used previously, and the mixture was transported to a melt polymerization vessel having a draw outlet. Then, melt polymerization was performed by raising the temperature from 145° C. to 300° C. over 4 hours and 5 minutes while distilling off the by-produced acetic acid and unreacted acetic anhydride, followed by retention at 300° C. for 20 minutes. Next, the polymer melt as contents was drawn in a molten state through the draw outlet of the melt polymerization vessel, and cooled to room temperature. The obtained solid matter was ground by a grinder to obtain a granulate of the polymer melt as a powder having a particle diameter of about 0.1 to 2 mm. This granulate showed a flow initiation temperature of 254° C.

The obtained powder was placed in a tray made of SUS (solid phase polymerization vessel) and then solid phase polymerization was performed by raising the temperature from room temperature to 250° C. over 1 hour under a nitrogen gas atmosphere and raising the temperature from 250° C. to 285° C. over 5 hours, followed by retention at 285° C. for 5 hours. Next, the tray made of SUS containing the solid phase polymer was fallen 50 cm by allowing the opening to face downward. The solid phase polymer was taken out from the tray made of SUS by making an impact thereon and then recovered. This solid phase polymer showed a flow initiation temperature of 328° C. The amount of the solid phase polymer remaining in a state of being adhered to the tray made of SUS was 1.0% by mass based on the powder placed in the tray made of SUS so as to perform solid phase polymerization.

Example 2

The same operation as in Example 1 was performed, except that 1-methylimidazole was not used in case of acylation and melt polymerization. The granulate of the polymer melt showed a flow initiation temperature of 252° C. and the recovered solid phase polymer showed a flow initiation temperature of 330° C. The amount of the solid phase polymer remaining in a state of being adhered to the tray made of SUS was 5.1% by mass based on the powder placed in the tray made of SUS so as to perform solid phase polymerization.

What is claimed is:

1. A method for producing a liquid-crystalline polyester, the method comprising:
   a step of melt-polymerizing raw monomers in a melt polymerization vessel to obtain a polymer melt;
   a step of drawing the polymer melt from the melt polymerization vessel and granulating the polymer melt to obtain a granulate;
   a step of allowing the granulate to undergo solid phase polymerization in a solid phase polymerization vessel to obtain a solid phase polymer; and
   a step of making an impact on the solid phase polymerization vessel containing the solid phase polymer, and taking out the solid phase polymer from the solid phase is polymerization vessel.

2. The method for producing a liquid-crystalline polyester according to claim 1, wherein the raw monomers comprises at least one kind of a compound (1) selected from the group consisting of an aromatic hydroxycarboxylic acid and polymerizable derivatives thereof, at least one kind of a compound (2) selected from the group consisting of an aromatic dicarboxylic acid and polymerizable derivatives thereof, and at least one kind of a compound (3) selected from the group consisting of an aromatic diol, an aromatic hydroxyamine, an aromatic diamine and polymerizable derivatives thereof.

3. The method for producing a liquid-crystalline polyester according to claim 2, wherein the compound (1) is a compound represented by the formula (1) shown below, the compound (2) is a compound represented by the formula (2) shown below, and the compound (3) is a compound represented by the formula (3) shown below:

$$R^{11}\text{—O—}Ar^1\text{—CO—}R^{12} \qquad \text{Formula (1):}$$

wherein $Ar^1$ represents a phenylene group, a naphthylene group or a biphenylylene group, $R^{11}$ represents a hydrogen atom or an acyl group, $R^{12}$ represents a hydroxyl group, an alkoxyl group, an aryloxyl group, an acyloxyl group or a halogen atom, and hydrogen atoms existing in the group represented by $Ar^1$, each independently, may be substituted with a halogen atom, an alkyl group or a aryl group;

$$R^{21}\text{—CO—}Ar^2\text{—CO—}R^{22} \qquad \text{Formula (2):}$$

wherein $Ar^2$ represents a phenylene group, a naphthylene group, a biphenylylene group, or a group represented by the formula (4) shown below, $R^{21}$ and $R^{22}$ each independently represents a hydroxyl group, an alkoxyl group, an aryloxyl group, an acyloxyl group or a halogen atom, and hydrogen atoms existing in the group represented by $Ar^2$, each independently, may be substituted with a halogen atom, an alkyl group or an aryl group;

$$R^{31}\text{—X—}Ar^3\text{—Y—}R^{32} \qquad \text{Formula (3):}$$

wherein $Ar^3$ represents a phenylene group, a naphthylene group, a biphenylylene group, or a group represented by the formula (4) shown below, X and Y each independently represents an oxygen atom or an imino group, $R^{31}$ and $R^{32}$ each independently represents a hydrogen atom or an acyl group, and hydrogen atoms existing in the group represented by $Ar^3$, each independently, may be substituted with a halogen atom, an alkyl group or an aryl group; and $$\text{—}Ar^{41}\text{—Z—}Ar^{42}\text{—} \qquad \text{Formula (4):}$$

wherein $Ar^{41}$ and $Ar^{42}$ each independently represents a phenylene group or a naphthylene group, and Z represents an oxygen atom, a sulfur atom, a carbonyl group, a sulfonyl group or an alkylidene group.

4. The method for producing a liquid-crystalline polyester according to any one of claim 1, wherein the melt polymerization is performed in the presence of a heterocyclic compound containing two or more nitrogen atoms.

5. The method for producing a liquid-crystalline polyester according to claim 4, wherein the heterocyclic compound is a compound represented by the formula (I) shown below:

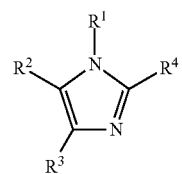

wherein $R^1$ to $R^4$ each independently represents a hydrogen atom, an alkyl group, an aryl group or an aralkyl group.

* * * * *